United States Patent [19]

Bell et al.

[11] Patent Number: 4,637,014

[45] Date of Patent: Jan. 13, 1987

[54] METHOD OF INSERTING AND REMOVING ISOCHRONOUS DATA INTO A SEQUENCE OF NONISOCHRONOUS DATA CHARACTERS WITHOUT SLOT ALLOCATION ON A COMPUTER NETWORK

[75] Inventors: John L. Bell, Escondido; David L. Isaman, San Diego; Fazil I. Osman, Escondido, all of Calif.

[73] Assignee: Burroughs Corporation, Detroit, Mich.

[21] Appl. No.: 581,351

[22] Filed: Feb. 17, 1984

[51] Int. Cl.⁴ .................................................. H04J 3/26
[52] U.S. Cl. ..................................... 370/89; 340/825.05
[58] Field of Search ........................ 370/89, 86, 94, 95, 370/99; 340/825.05, 825.5, 825.51

[56] References Cited

U.S. PATENT DOCUMENTS

| | | | |
|---|---|---|---|
| 4,549,292 | 10/1985 | Isaman et al. | 370/89 |
| 4,553,234 | 11/1985 | Brandsma et al. | 370/89 |
| 4,566,097 | 1/1986 | Bederman | 370/89 |
| 4,587,650 | 5/1986 | Bell | 370/89 |

Primary Examiner—Douglas W. Olms

Attorney, Agent, or Firm—Charles J. Fassbender; Kevin R. Peterson

[57] ABSTRACT

A method of transmitting isochronous and nonisochronous data in a computer network in which multiple stations have respective input and output ports that are serially coupled together to form a loop includes the steps of: transmitting nonisochronous data from one station of the network and passing it through the remaining stations; periodically inserting into the nonisochronous data a lead control character followed by a trail control character and circulating the control characters twice around the network; increasing, in any station of the network that has isochronous data to send, the distance between the lead and trail control characters and sending isochronous data immediately before the trail control character as it passes through the station; subsequently decreasing the distance between the lead and trail control characters in each station of the network that performs the sending step by removing, from immediately behind the first lead control character to enter the station after the sending step begins, the same number of characters that it sent before the trail control character.

13 Claims, 7 Drawing Figures

FIG. 4.

| | S1 | S2 | S3 | RT | S4 | S5 | S6 |
|---|---|---|---|---|---|---|---|
| ★1 | 100 | 99 | 98 | 97 | 96 | 95 | 94 |
| ★2 | DT | 100 | 99 | 98 | 97 | 96 | 95 |
| 3 | T | DT | 100 | 99 | 98 | 97 | 96 |
| 4 | I | I | DT | 100 | 99 | 98 | 97 |
| 5 | I | DH | I | DT | 100 | 99 | 98 |
| 6 | I | 1 | DH | I | DT | 100 | 99 |
| 7 | I | 2 | 1 | DH | I | DT | 100 |
| 8 | I | 3 | 2 | 1 | DH | I | DT |
| 9 | I | 4 | 3 | 2 | 1 | DH | I |
| 10 | I | 5 | 4 | S | 2 | 1 | DH |
| 11 | DH | 6 | 5 | I1' | S | 2 | 1 |
| 12 | 1 | 7 | 6 | I2' | I1' | S | 2 |
| 13 | 2 | 8 | 7 | E | I2' | I1' | S |
| 14 | S | 9 | 8 | 3 | E | I2' | I1' |
| 15 | I1' | S | 9 | 4 | 3 | E | I2' |
| 16 | I2' | I1' | S | 5 | 4 | 3 | E |
| 17 | E | I2' | I1' | 6 | 5 | 4 | 3 |
| 18 | 3 | E | I2' | 7 | 6 | 5 | 4 |
| 19 | 4 | 10 | E | 8 | 7 | 6 | 5 |
| 20 | 5 | 11 | 10 | 9 | 8 | 7 | 6 |
| 21 | 6 | 12 | 11 | 10 | 9 | 8 | 7 |
| 22 | 7 | 13 | 12 | 11 | 10 | 9 | 8 |
| 23 | 8 | 14 | 13 | 12 | 11 | 10 | 9 |

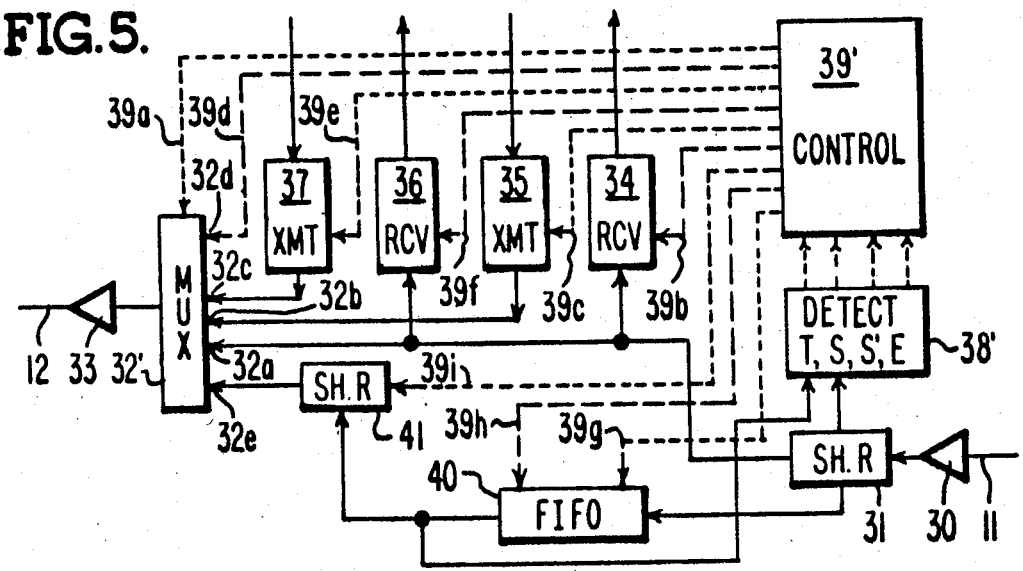

METHOD OF INSERTING AND REMOVING ISOCHRONOUS DATA INTO A SEQUENCE OF NONISOCHRONOUS DATA CHARACTERS WITHOUT SLOT ALLOCATION ON A COMPUTER NETWORK

BACKGROUND OF THE INVENTION

This invention relates to computer networks in which a plurality of stations have respective input and output ports that are serially coupled together in a loop; and more particularly, it relates to methods of operating the stations in the network such that both isochronous information (e.g., periodic voice samples) and nonisochronous data (blocks of characters in a computer data bank) are efficiently and simultaneously transferred between the stations.

In the past, various methods and protocols have been used to transmit messages from one station to another in a computer network of the type referred to above. However, a problem with transmitting both voice samples and data characters in a single network is that they have totally different bandwidth requirements, latency requirements, and integrity requirements.

Voice requires a small bandwidth over a long time duration. High quality voice can be transmitted in a bandwidth of only 64 kilobits per second; but the bandwidth must be available for the entire duration of a conversation. Typically, a telephone conversation lasts several minutes.

Data, on the other hand, requires a large bandwidth for a short time duration. For example, data that is read by a computer from a disk or RAM memory for transmission can be read at millions of bits per second. At that rate, an entire block of data can be transmitted in only a few seconds.

As to the latency requirement, voice samples must be generated and received at regular intervals. Any latency between source and destination must remain constant in order to avoid distortion of pitch and tone. Further, due to the characteristics of public carriers, it is necessary that voice destined to travel on such a public carrier reach that carrier with a latency of no more than one millisecond; otherwise, echo is introduced into the conversation.

Computer data, by comparison, can be delayed in a station before its transmission for several minutes. Also, the time delay between consecutive blocks of a multi-block transmission from a station can vary from one block to the next.

As to the integrity requirement, a voice sample can occasionally be delivered to a receiving station in a corrupted form; or it may not be delivered at all. Such an occasional error will not be detectable by a person that listens to the reconstructed voice at the receiving station. Thus there is no need to retransmit a voice sample that has been delivered in error.

On the other hand, dropping just a single bit in a block of computer data during its transmission from one station to another generally is intolerable. Consequently, each block of computer data generally has error check codes appended to it. Also, a response is generally sent by the station that receives a data block back to the transmitting station indicating the condition in which the data block was received.

Accordingly, a primary object of this invention is to provide a method of operating the stations in a computer network which enables both voice and data to be simultaneously transmitted between the stations of a computer network while satisfying all of the above-described conflicting requirements of bandwidth, latency, and integrity.

BRIEF SUMMARY OF THE INVENTION

A method of transmitting both isochronous and nonisochronous data through the stations of a computer network in accordance with the invention includes the steps of:

transmitting data characters of a nonisochronous frame from a first station around said network;

circulating around said network within said nonisochronous frame a lead control character followed by a trail control character;

sending isochronous data characters from a plurality of said stations in said network such that each station of said plurality inserts its isochronous data characters immediately before said trail character as it circulates through the station; and each station of said plurality which inserts a number of isochronous data characters before said trail character operating to remove that same number of characters from immediately behind said lead character the first time said lead character passes into the station after the inserting step begins.

BRIEF DESCRIPTION OF THE DRAWINGS

Various features and advantages of the invention are described in the Detailed Description in conjunction with the accompanying drawings wherein:

FIG. 4 illustrates the steps by which the stations of FIGS. 2 and 3 operate in the network of FIG. 1.

FIG. 5 shows the details of a single station that can replace the stations of FIGS. 2 and 3 in the network of FIG. 1; and FIGS. 6A and 6B illustrate the steps by which the FIG. 5 station operates in the network of FIG. 1.

DETAILED DESCRIPTION OF THE INVENTION

Figure 1:
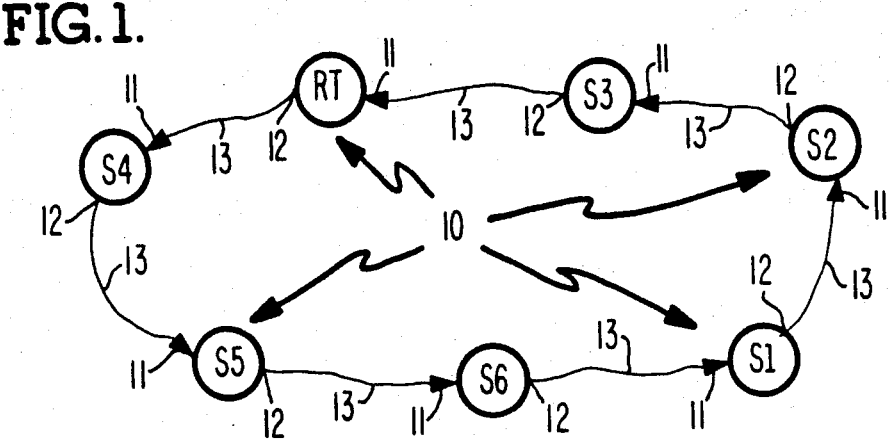
FIG. 1 illustrates a computer network in which the present invention is carried out.

Referring now to FIG. 1, there is illustrated a computer network 10 which is comprised of a plurality of stations S1, S2, S3, RT, S4, S5, and S6. Each of the stations has an input port 11 and an output port 12; and they are serially coupled together via a coupling 13 to form a communication loop. Ports 11 and 12 may respectively receive and transmit signals in a bit serial fashion or in a parallel fashion. Also, coupling 13 may suitably be electrical or optical.

Figure 2:
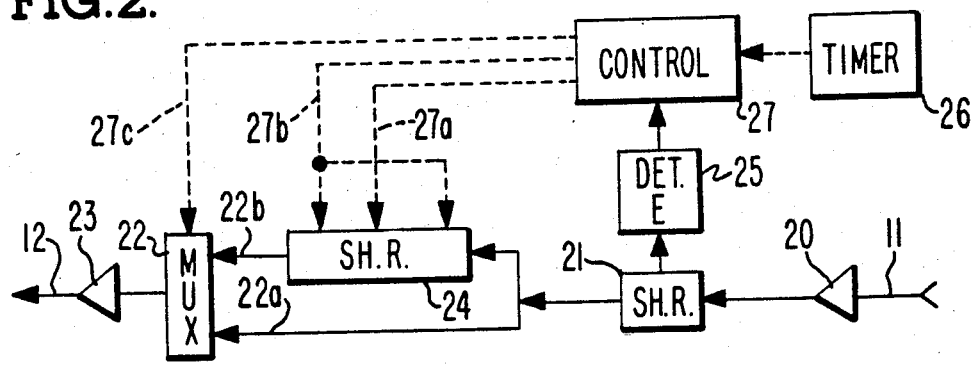
FIG. 2 shows the details of a station RT in FIG. 1.

A diagram of station RT is shown in FIG. 2. This station initiates transfers of "real time" isochronous data frames around the network 10; hence it is labeled with the letters RT. Isochronous frames from station RT occur at regular period time intervals; and they "interrupt" any other data transfers that may be occurring on network 10 at the same time. That is, isochronous frames from station RT temporarily stop and override any other data transfers that may be occurring on network 10.

In FIG. 2, input port 11 is a bit serial conductor which couples through a receiver 20 to a shift register 21. Shift register 21 has a serial output which couples to an input 22a of a multiplexer 22; and the output of multiplexer 22 is coupled through a transmitter 23 to output port 12. Thus, a data path is formed by components 11, 20, 21, 22a, 22, 23, and 12 which pass data from input port 11 to output port 12 of station RT with a delay which those components impose. In one specific embodiment, register 21 stores one character (8 bits), and thus imposes a delay of eight bit periods.

Shift register 21 also has its output coupled to the input of another shift register 24 which in turn has its output coupled to another input 22b of multiplexer 22. Thus, a second data path is formed through station RT by components 11, 20, 21, 24, 22b, 22, 23, and 12. This second data path has a delay which is longer than the previously described data path due to the presence of shift register 24. In one specific embodiment, register 24 stores four characters (32 bits), and thus imposes a delay of thirty-two bit periods.

Also included in station RT is a detection circuit 25, a timer circuit 26, and a control circuit 27. Circuit 25 monitors the contents of shift register 21 to detect the presence of a special control character E. Upon detecting an E character, circuit 25 signals control circuit 27. Another signal to control circuit 27 is provided by timer 26. It signals circuit 27 periodically at a predetermined frequency.

Control circuit 27 has three outputs 27a, 27b, and 27c. Clock signals are generated on output 27a to shift data through shift register 24. A pair of isochronous frame control signals S and E are respectively written into the beginning and end of shift register 24 by a control signal on output 27b. And multiplexer control signals are generated on output 27c and sent to multiplexer 22 to select one of the multiplexer inputs 22a and 22b.

In a quiescent state, controller 27 generates signals on its output 27c which pass data from input port 11 to output port 12 along path 20, 21, 22a, and 23. Subsequently, when timer 26 generates one of its periodic timing signals, circuit 27 generates the S and E characters respectively in the beginning and end of shift register 24. Thereafter, circuit 27 passes data from the input port to the output port along path 20, 21, 24, 22b, 22, and 23 until circuit 25 detects an E character in shift register 21. Then circuit 27 reverts back to its quiescent state. How this operation fits into the overall operation of network 10 will be explained in further detail in conjunction with FIG. 4.

Figure 3:
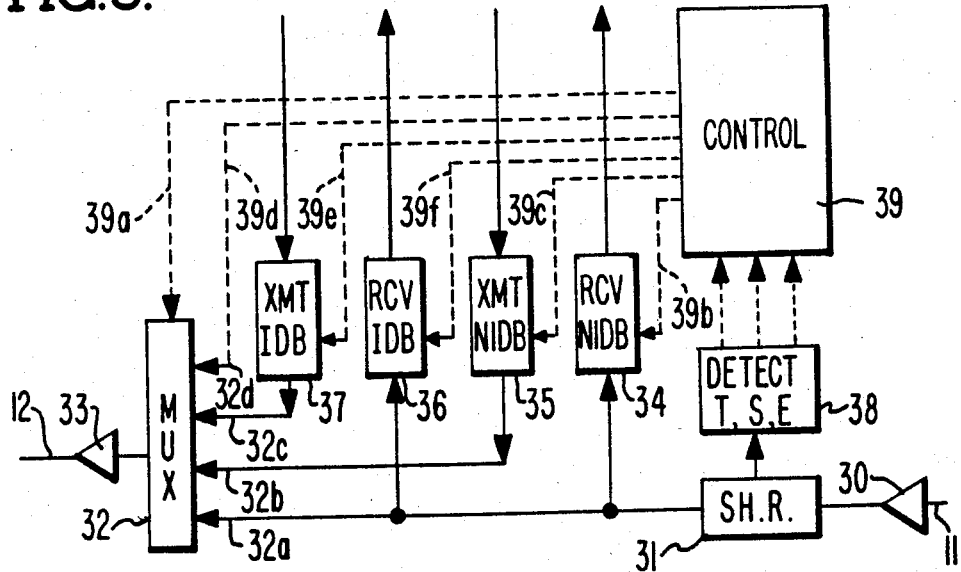
FIG. 3 shows the details of stations S1, S2, S3, S4, S5, and S6 in FIG. 1.

Consider now, however, the structure of stations S1, S2, S3, S4, S5, and S6 as illustrated in FIG. 3. Input port 11 of those stations is serially coupled to output port 12 through a receiver 30, a shift register 31, an input 32a of a multiplexer 32, and a transmitter 33. Thus data is passed from the input port to the output port with a delay which those components provide. In one specific embodiment, register 31 stores one character and thus imposes a delay of eight bit periods.

In addition, the FIG. 3 station includes four independent data buffers 34, 35, 36, and 37. Buffer 34 has an input that is coupled to the output of shift register 31 to receive nonisochronous data from the shift register. Buffer 35 contains nonisochronous data that is to be transmitted; and so it has an output that is coupled to an input 32b of multiplexer 32. Buffer 36 has an input that is coupled to the output of shift register 31 to receive isochronous data from the shift register. And buffer 37 contains isochronous data that is to be transmitted; and so it has an output that is coupled to an input 32c of multiplexer 32.

Further included in the FIG. 3 station is a detector circuit 38 which is coupled to shift register 31 for detecting three control characters T, S, and E. T represents a token; and S and E are the control characters that station RT generates in its shift register 24. S identifies the start of an isochronous frame, and E indicates its end.

A control circuit 39 is also included in the FIG. 3 station. It receives signals from the detector circuit 38 indicating the presence of a T, S, or E character in shift register 31; and in response thereto, it sends control signals on conductors 39a–39f to control the flow of data through the station. In a quiescent state, circuit 39 generates control signals on conductor 39a which direct multiplexer 32 to pass data from the input port to the output port through the multiplexer input 32a. As that data is passed through the station, circuit 39 may also generate control signals on conductor 39b to direct data buffer 34 to store a copy of the data as it passes through the station.

Subsequently, when circuit 38 detects the presence of a T in shift register 31, circuit 39 generates new control signals on conductors 39a and 39c. The signals on conductors 39c direct buffer 35 to send data to multiplexer input 32b, while the signals on conductor 39a pass multiplexer input 32b to the output port. After this writing operation is complete, control circuit 39 then generates a T followed by idle signals on conductors 39d, and it generates signals on conductor 39a which pass multiplexer input 32d to the output port.

At any time during the above-described passing of data from the input port to the output port or writing of nonisochronous data from data buffer 35, circuit 38 can detect an S character in shift register 31. If that occurs and the station has isochronous data in data buffer 37 to send, circuit 39 then generates control signals on conductors 39e which send data from buffer 37 to multiplexer input 32c, and it generates signals on conductor 39a which pass signals on multiplexer input 32c to the output port. At the same time, if the station has isochronous data to read, then circuit 39 generates control signals on conductor 39f which direct buffer 36 to store a copy of the signals from shift register 31. Subsequently, when circuit 38 detects the E character in shift register 31, control circuit 39 generates control signals on its output conductors which resume the operation that was occurring prior to the detection of the S character.

Reference should now be made to FIG. 4 which illustrates how the above-described stations of FIGS. 2 and 3 operate in conjunction with one another in a network. FIG. 4 is in the form of a rectangular array in which the columns are labeled S1, S2, S3, RT, S4, S5, and S6 and the rows are labeled T1 through T23. Each entry in this array shows the data that is being transmitted from a station which is identified by the column at a time that is identified by the row. For example, station S2 at time t8 is transmitting a character D3 from its output port.

Also in FIG. 4, the presence of a small triangle in the bottom-right corner of an array entry indicates a station is internally generating data on its output port that was stored within the station, as opposed to merely passing data from its input port to its output port. For example, at time t6, station S2 is generating internally stored data on its output port; while at time t1, station S2 is passing data from its input port to its output port.

Further in FIG. 4, if an entry in column RT is underlined, the underlining indicates that data is being passed from the input port to the output port through shift register 24. Conversely, an entry in column RT which is not underlined indicates that the shift register 24 is being bypassed.

Consider now the state of the stations at time t1. That state indicates that station S1 has been transmitting internally generated data from its output port for the last hundred characters and the remaining stations have been passing those characters. Each of the shift registers 21 and 31 provide a one character delay, so stations S2, S3, RT, S4, S5, and S6 respectively pass characters 99, 98, 97, 96, 95, and 94 on their output ports when station S1 is generating character 100 on its output port.

At time t2, station S1 completes its transmissions of internally stored nonisochronous data by sending a data trailer DT. This may be several status characters and error code correction characters; but it is shown as only one character for simplicity. Then at time t3, station S1 regenerates the token T. Thereafter, station S1 generates idle characters on its output port until it receives its own data trailer on its input port. Then station S2 passes data from its input port to its output port.

Station S2 continues to pass data from station S1 until it receives the token T. When that occurs, station S2 begins its own transmissions. Those transmissions begin in FIG. 4 at time t4. First, station S2 sends an idle character I; then it sends a data header character DH; and then it sends data characters 1, 2, 3, etc. Here again the data header may be several characters that identify the sending station, the station that is to receive the data, etc.

All of the characters that are received by station RT are sent through that station such that shift register 24 is bypassed until station RT receives one of the periodic timing signals from its timer 26. In FIG. 4, one of those timing signals is indicated as occurring at time t10.

At time t10, controller 27 generates signals on conductor 27b to form the S and E control characters at the beginning of shift register 24; it sends clocking signals on conductor 27a to cause data to move through shift register 24; and it sends signals on conductor 27c to pass multiplexer input 22b to output port 12.

Thus, at time t10, an S control character is sent from shift register 24 to output port 12, while data character 3 is sent from input port 11 to shift register 24. Similarly, at time t11, an isochronous data frame character I1 which was stored in shift register 24 between the S and E control characters is sent from shift register 24 to output port 12; while at the same time, data character 4 is sent from input port 11 to shift register 24. In like fashion, characters I2, E, 3, 4, etc., are sent through shift register 24 to output port 12 at time t12, t13, t14, t15, etc.

Consider now what happens when the isochronous frame S, I1, I2, E passes through station S4. Prior thereto, station S4 passes data from its input port to its output port through components 30, 31, 32a, 32, and 33. However, when the S control character enters shift register 31, circuit 38 detects the S and signals control circuit 39 of its presence. Then, if station S4 has isochronous data (e.g., voice) to send, it inserts an 8-bit sample in one of the isochronous character slots between the S and E control characters. As an example, FIG. 4 shows that station S4 inserts an isochronous data character I2' over the previous character I2 at time t13. Also, if station S4 is receiving isochronous data from another station on the network, then it copies the data in one of the isochronous character slots between the S and E character into the data buffer 36. For example, station S4 may copy the I1 character at time t12.

Station S5 behaves in a similar fashion when it detects the S control character in its shift register 31. As an example, FIG. 4 shows that station S5 writes a new isochronous data character I1' over the previous character I1 at time t13. Station S5 may also store a copy of the other isochronous data character I2' in its data buffer 36 at time t14.

Suitably, the determination of which slot a particular station can write into and which slot a particular station can read from is made by designating one of the stations as a master; and by sending requests to the master prior to writing or receiving data in the isochronous frame. This master then does the slot-allocating bookkeeping and sends messages back to a requesting station telling it which slots in the isochronous frame to use.

Next, consider what happens after the isochronous frame passes around the communication network 10 and into the station which is presently transmitting nonisochronous data. In FIG. 4, that event is shown as occurring at time t15. Prior to time t15, the transmitting station S2 is receiving its own data on its input port. That data enters shift register 31 but does not pass through multiplexer 32. Thus the nonisochronous data is removed from network 10.

When the transmitting station S2 receives an S control character in a shift register 31, it immediately stops transmitting data from its buffer 35 and instead passes data from shift register 31 to the output port. Here again, as the isochronous data frame is passing through station S2, it may also read (write) an isochronous character from (to) the isochronous frame. Thereafter, when station S2 detects an E control character in its shift register 31, it resumes transmitting characters from its data buffer 35 and resumes removing data from the network that it receives on its input port. This is shown as occurring at time t19, t20, t21, . . . , etc.

Subsequently, the isochronous frame will pass all the way around network 10 and back into station RT. Then, after the E character has passed through shift register 21 and into shift register 24, station RT stops clocking shift register 24 and resumes passing data from its input port to its output port along the path 20, 21, 11a, 22, and 23. In FIG. 4 this is shown as occurring at time t21, t22, . . . , etc.

Referring now to FIG. 5, the construction and operation of another station will be described and compared with the above described station of FIG. 3. A primary feature of the FIG. 5 station is that by utilizing it in a network such as network 10 of FIG. 1, an extra controller RT is not needed to perform the bookkeeping that determines when a station can transmit isochronous data. That is, controller RT is eliminated: and the method by which each station operates determines when it can transmit isochronous data.

Some of the components of the FIG. 5 station are the same as those of the FIG. 3 station; and they are identified by like reference numerals. Also, some of the components of the FIG. 5 station are modified but somewhat similar to corresponding components of the FIG. 3 station; and they are identified by like reference numerals with a prime. Further, some of the components of the FIG. 5 station have no counterpart in the FIG. 3 station; and they are identified by new reference numerals.

For example, the FIG. 5 station includes a multiplexer 32' which has a new input 32e. Also, the FIG. 5 station includes a first-in-first-out buffer (FIFO) 40 which has control inputs 39g and 39h. A character is loaded from shift register 31 into FIFO 40 in response to a control signal on conductor 39g; and a character is removed from FIFO 40 and loaded into a shift register 41 in response to a control signal on conductor 39h.

A modified control logic circuit 39' generates the control signals on conductors 39g and 39h. Circuit 39' also generates a control signal on a conductor 39i which loads a control character S' into shift register 41. Circuit 39 also generates the previously described control signals on conductors 39a through 39f. All of the above control signals are generated in response to the detection of control characters T, S, S', and E by a detector circuit 38'.

Control characters S and S' are detected by circuit 38' on the output of FIFO 40. Character S' indicates the start of an isochronous frame just as does character S, but character S' indicates that the frame is circulating around network 10 for the second time. Also, control characters T, S, and E are detected in shift register 31, and their meaning is as was defined above.

Consider now the method by which the FIG. 5 station operates. In its quiescent state, a sequence of characters are received on input port 11 and passed through components 30, 31, 32a, 32' and 33 to output port 12. During this passing step, detector circuit 38' operates to detect at any point in the sequence control character S followed by control character E.

If the FIG. 5 station has isochronous data to send from its data buffer 37, it sends that data by inserting it immediately before control character E. Such an insertion is achieved by detecting control character E in shift register 31; and in response thereto, loading shift register 31 continuously into FIFO 40 while transferring data from the isochronous data buffer 37 through multiplexer 32' to output port 12. Then, after the desired number of characters have been transmitted from buffer 37, data is sent from FIFO 40 through shift register 41 and multiplexer 32' to output port 12 while data continues to be loaded from shift register 31 into FIFO 40.

Next, the controller circuit 39' monitors the signals from the detector circuit 38' to determine when control character S' is at the output of FIFO 40. Then, after character S' transfers through shift register 41 to the output port, FIFO 40 is reset and data is passed through the station as it was in the quiescent state. Stopping the flow of characters through FIFO 40 in the above fashion has the effect of removing from immediately behind the character S', the same number of characters that were inserted by the station before control character E.

FIGS. 6A and 6B illustrate the above described steps which the FIG. 5 station performs. This figure is similar to FIG. 4 in that the rows indicate various times and the columns indicate what the stations of the network are transmitting at those varrous times.

Initially at time t1, station S1 is transmitting nonisochronous data from its buffer 35. Those transmissions are in response to the receipt of a token prior to time t1. Also at time t1, data from station S1 is being passed by the other stations on the network. Thus, stations S2, S3, S4, S5, S6, and S7 respectively are transmitting characters 99, 98, 97, 96, 95, and 94 from their output port.

In addition to passing data from its input port to its output port, station S3 of FIG. 6 has an added responsibility of periodically generating the S, S', and E control characters. FIG. 6 shows that station S3 generates one S character at time t2 and one E character at time t3. Starting at time t2, station S3 also continuously loads data from shift register 31 to FIFO 40; and starting at time t4, station S4 continuously moves data from FIFO 40 through shift register 41 to output port 12.

Station S4 receives the S character on its input port at time t2, and it receives the E character on its input port at time t3. If station S4 had isochronous data to send, it would do so by inserting its isochronous data immediately before the E character. However, FIG. 6A shows that station S4 had no isochronous data to send, and thus it merely passed the S and E character to its output port.

Station S5 receives the E character from station S4 at time t4, and station S5 has two isochronous data characters 5A and 5B to send. Thus, it inserts characters 5A and 5B immediately before the control character E. This is illustrated as occurring at times t5, t6, and t7.

While station S5 is sending characters 5A and 5B, it is also passing the E character and all subsequent characters from its shift register 31 to its FIFO buffer 40. Then, after characters 5A and 5B are sent, data is transferred from the FIFO buffer 40 to output port 12. Thus the FIFO 40 in station S5 imposes a two character delay on data that passes from its input port to its output port.

Station S6 receives the E character in its shift register 31 at time t7; and it has four isochronous data characters 6A, 6B, 6C, and 6D to send. Thus, it sends characters 6A-6D immediately before the E character and simultaneously loads data from register 31 to FIFO 40. This occurs at times t8, t9, t10, and t11. Thereafter, station S6 passes data from its FIFO 40 to its output port with an internal delay of four characters being imposed by the FIFO.

Station S7 receives the E character at time t12; and it has three isochronous characters 7A, 7B, and 7C to send. Thus, it inserts those three characters immediately before the E character as illustrated at times t13, t14, and t15.

Station S1 has no isochronous data to send; however, it is the source of the nonisochronous data on the network. Thus, when station S5 detects the S character in its shift register 31, it stops sending nonisochronous data from its data buffer 35 and allows data to pass from its shift register 31 to its output port 12. This is illustrated as occurring at times t7 through t17.

At time t17, station S2 receives the E character in its shift register 31; and it has two isochronous data characters 2A and 2B to transmit. Thus, station S2 inserts characters 2A and 2B immediately before the E character. This is shown as occurring at times t18 and t19.

Recall now that station S3 was the station that initiated the S and E characters. That S character which station S3 initiated travels all the way around the network and back into shift register 31 of station S3 at time t8. From shift register 31, the S character is loaded into the FIFO 40; and two character times later, the S character is at the output of the FIFO. There the S character is detected by circuit 38'; and in response, circuit 39' generates a control signal on conductors 39h and 39i which respectively remove the S character from FIFO 40 and loads an S' character into shift register 41. This occurs at time t11.

In response to the receipt of the S' character on their input port, all of the stations on the network which transmitted isochronous data remove the same number of characters that they transmitted; and the characters which each station removes are those, which lie immediately behind the S' character. Thus station S5 removes two characters immediately behind the S' character; thereafter station S6 removes four characters immediately after the S' character, etc.

To implement the removal process, station S5 detects character S' at the output of its FIFO 40 at time t14. Then, at time t15, station S5 deletes two characters from immediately behind the S' control character by transferring the S' character to the shift register 41 and resetting FIFO 40. Then, at time t16 after character S' is sent to the output port, station S5 returns to the quiescent state by passing characters from its shift register 31 to the output port through multiplexer input 32a. This leaves the two characters that were immediately behind the S' character trapped in the FIFO 40.

Station S6 behaves in a similar fashion in order to remove four characters from immediately behind the S' character. At time t15, the S' character is received by shift register 31 in station S6. From there it passes through the FIFO 40; and at time t19, character S' is at the output of FIFO 40. Station S6 detects character S' at the output of its FIFO 40; and in response thereto, at time t20 station S6 transfers character S' to its shift register 41 and resets the FIFO. Then, at time t21 after character S' has passed to the output port, station S5 returns to its quiescent state and passes data characters from its shift register 31 through multiplexer input 32a to the output port.

Eventually, control character S' will circulate all the way around the network and back into the input port of station S3. In FIG. 6 this is illustrated as occurring at time t28. From shift register 31, character S' passes into FIFO 40; and at time t30, character S' will be at the output of FIFO 40. Circuit 38' detects the presence of character S' at the FIFO output, and in response thereto control circuit 39' causes station S3 to return to its quiescent state beginning at time t31 (not shown but which follows immediately after time t30). At time t31 all the stations S2-S7 are merely passing data from their input port through shift register 31 and multiplexer input 32a to their output port.

Various changes and modifications may be made to the above details without departing from the nature and spirit of the invention. For example, the two control characters S and E can circulate continuously through the network rather than being periodically inserted. With this modification, the S character is never changed to an S' character; a station inserts data immediately before an E character; and a station removes the same number of characters that it inserts from immediately behind the first S character that enters the station after the inserting step begins.

With the above modification, some stations may be inserting data while other stations are removing data during the same circulation of the S and E characters through the network. For example, during one circulation of the S and E characters, stations 2, 4 and 7 can insert their respective data immediately before the E character. Subsequently, during the next circulation of the S and E characters, stations 2, 4 and 7 will remove the same number of characters that they inserted from immediately behind the S character while stations 1, 3 and 5 can insert their respective data immediately ahead of the E character.

Also, regardless of whether the S and E characters periodically circulate or continuously circulate in the network, it is possible for the S character to travel all the way around the network and catch up to the E character. This occurs when a station transmits a number of characters which is so large that it exceeds the total transmission delay through the network.

Suppose, for example, that at time t8 in FIG. 6A station S6 transmitted 20 characters. In FIG. 6, the total delay through the network is only six characters long. Thus station S6 would receive the S character on its input port before regenerating the E character on its output port. But in such a case, the operation of the transmitting station remains the same as it was described above. That is, a station that transmits N characters immediately before the E character always removes N characters from immediately behind the S character.

To accomplish the transmitting and removing steps, a station begins loading data into its FIFO 40 when its transmission begins in response to detecting the E character. Removing data from FIFO 40 begins when the transmission in response to the E character ends. Subsequently, when the S character is detected at the output of FIFO 40 and sent via shift register 41 to the output port, data on the input port is passed through shift register 31 directly to the output port.

As another modification, any number of stations can be included in network 10. Further, any particular bit configuration, including code violations, may be used to signify the control characters T, S, S' and E. For example, a "1" bit and a "0" bit can be signified by one signal transition respectively in the first half and second half of a bit period, and selected bits of the control characters can have zero signal transitions per bit period. In addition, any type of logic circuitry, such as $T^2L$ or MOS circuitry may be used to implement the stations of FIGS. 2, 3 and 5. For example, all of the components can be implemented according to the following table.

| | |
|---|---|
| TI 7440 | 20,30 |
| TI 74164 | 21,24,31 |
| Signetics 82S100 | 25,38,38' |
| TI 74S151 | 22,32,32' |
| TI 74140 | 23,33 |
| Synertek SY2167 | 34,35,36,37 |
| TI 74165 | 41 |
| Motorola K1115A & TI 74S169 | 26 |
| Intel 8086 | 27,39,39' |
| Signetics 82S210 & Signetics 8x6FRC | 40 |

Accordingly, since many such changes and modifications can be made to the above described details, it is understood that the invention is not limited to those details but is defined by the appended claims.

What is claimed is:

1. A method of transmitting isochronous and nonisochronous data in a computer network in which multiple stations have respective input and output ports that are serially coupled together to form a loop; said method including the steps of:
 transmitting said nonisochronous data from a first station of said network and passing it through the remaining stations;
 periodically inserting into said nonisochronous data, from a second station of said network, a lead control character followed by a trail control character and circulating said control characters twice around said network;

increasing, in any station of said network that has isochronous data to send, the distance between said lead and trail control characters and sending said isochronous data immediately before the trail control character as it passes through the station;

subsequently decreasing the distance between said lead and trail control characters in each station of said network that performs the sending step by removing, from immediately behind the first lead control character to enter the station after the sending step begins, the same number of characters that it sent before the trail control character.

2. A method according to claim 1 and further including the steps of modifying, in said second station, the bit configuration of said lead control character as it passes through said second station and starts to circulate for the second time around said network, sending said isochronous data in a station only if the last received lead character was not modified, and performing the removing step only if the last received lead character was modified.

3. A method according to claim 1 and further including the steps, by a station which sends isochronous data, of: loading characters from said input port into a FIFO buffer starting from the first receipt of said trail control character on that station's input port, removing characters starting from said FIFO to that station's output port from the end of said sending step, and stopping both said loading and removing steps when said lead character is on the output of said FIFO.

4. A method of transmitting data from a station in a computer network; said station having an input port and an output port for coupling said station into said network; said method including the steps of:

receiving a sequence of characters on said input port and passing them to said output port;

detecting, in said sequence, a lead control character and a subsequent trail control character with several data characters therebetween;

modifying said sequence by inserting a number of data characters immediately before said trail control character as it passes to said output port; and removing from immediately behind said lead character, the same number of characters that were inserted before said trail character; said removing step occurring the first time said lead character enters said input port after said modifying step begins.

5. A method according to claim 4, and further including the steps of periodically passing said control characters through said network and subsequently stopping their passage in said second station after two complete passes through said network.

6. A method according to claim 5 and further including the step of modifying the bit configuration of said lead character the second time it passes through said network, and inserting data characters before the character only if the last received lead character w modified.

7. A method according to claim 4 wherein said and trail control characters continuously pass through said stations, several of said stations perform the step during a first passage of said control characters, and during the next passage of said control characters said several stations perform said removing step while other stations perform the inserting step.

8. A method according to claim 4 and further including the steps of: loading characters from said input port into a FIFO buffer starting from the beginning of said inserting step, removing characters from said FIFO to said output port starting from the end of said inserting step, and stopping both said loading and removing steps when said lead character is on the output of said FIFO.

9. A method of transmitting data in a computer network in which multiple stations have respective input and output ports that are serially coupled together to form a loop; said method including the steps of:

circulating through said network a lead control character followed by a trail control character;

sending data characters from a plurality of said stations in said network, each station of said plurality operating to insert its data characters immediately before said trail character as it circulates through the station; and each station of said plurality which inserts a number of data characters before said trail character operating to remove that same number of characters from immediately behind said lead character the first time said lead character passes into the station after the inserting step begins.

10. A method according to claim 9 and further including the steps of periodically initiating the circulating of said control characters from one station on said network, and subsequently terminating their circulation after two complete passes around said network.

11. A method according to claim 10 and further including the steps of modifying the bit configuration of said lead control character the second time it leaves said one station, performing the inserting step in each station of said plurality only if the last received lead character was not modified, and performing the removing step only if the last received lead character was modified.

12. A method according to claim 9 wherein said lead and trail control characters continuously circulate through said stations, several of said stations perform the inserting step during a first circulation of said control characters, and during the next circulation of said control characters said several stations perform said removing step while other stations perform the inserting step.

13. A method according to claim 9 and further including the steps of generating a sequence of data characters from one station while said control characters circulate on said network, said generating step being temporarily interrupted in said one station upon the receipt therein of said lead control character and resumed on the receipt of said trail control character.

* * * * *